Feb. 14, 1967   R. K. LEWIS ETAL   3,303,596
FISHBAIT CONTAINER AND FLOAT
Filed May 21, 1965

INVENTORS
Roy. K. Lewis
BY Raymond W. Lewis
Cecil L. Wood
ATTORNEY

United States Patent Office 3,303,596
Patented Feb. 14, 1967

3,303,596
FISHBAIT CONTAINER AND FLOAT
Roy K. Lewis, 3530 Cedar Spring Ave., Dallas, Tex. 75219, and Raymond W. Lewis, 5735 Richmond Ave., Dallas, Tex. 75206
Filed May 21, 1965, Ser. No. 457,640
2 Claims. (Cl. 43—41.2)

This invention relates to fishing equipment, and it has particular reference to a combination float and bait protector for use in casting or pole fishing.

The invention is especially designed for the preservation of live bait, such as minnows, when used with a casting rod, and functions to protect the bait from injury or dislodgment from a hook while casting but releasing and exposing it when it strikes the water, and providing for means to safely retrieve the bait as desired.

An object of the invention is that of providing a simple and economical device by which any type of bait can be enclosed within a buoyant container which is self-closing and capable of opening when afloat to release and expose the bait to attract the fish, the device being so constructed as to enable the bait to be withdrawn thereinto and enclosed thereby thus insuring its safe retrieval.

A further object of the invention resides in the provision of a bait retainer in which is embodied a closure for the bait in casting, a float, and a suitable weight by which the device is supported at the surface of the water in a vertical position simulating a buoy while the bait is allowed to drop out of the container to any predetermined depths for attracting the fish.

While the foregoing objects are paramount, other and lesser objects will become apparent as the description proceeds when considered in connection with the appended drawings wherein.

Figure 1:
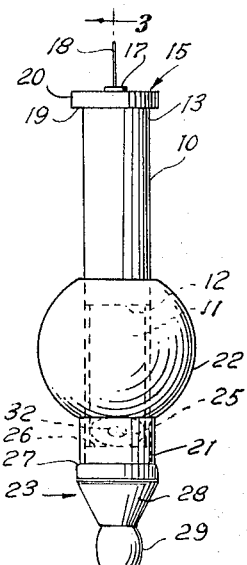
FIGURE 1 is an elevational view of the invention as suspended on a line showing the bait container closed by the float.
Figure 2:
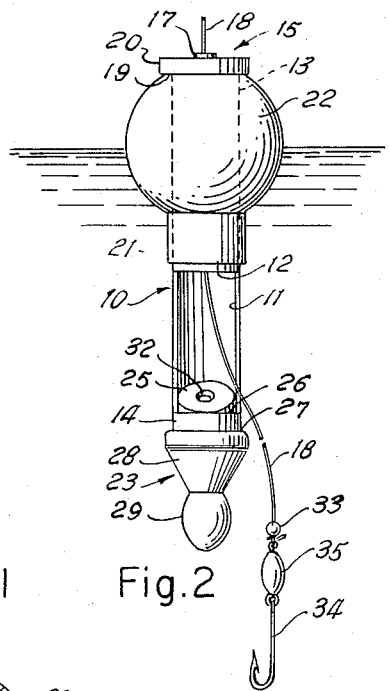
FIGURE 2 is an elevational view of the invention suspended in water by the float, the open bait container extending below the water's surface and the hook being exposed below the container.
Figure 3:
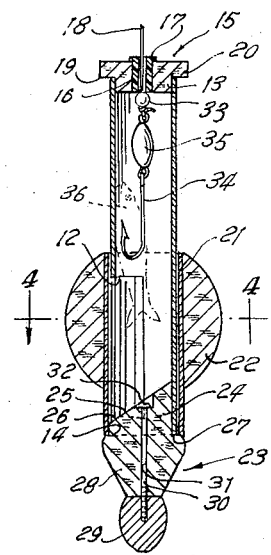
FIGURE 3 is a vertical sectional view, on line 3—3 of FIGURE 1, showing the cylindrical container suspended on a line and the float in its lowermost position to close the container to entrap the bait shown in broken lines.
Figure 4:
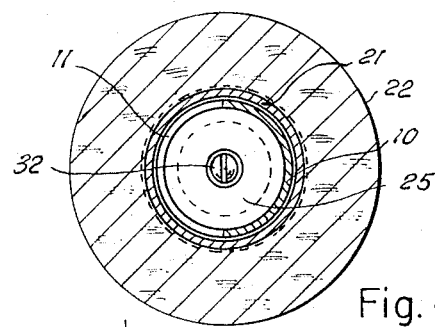
FIGURE 4 is a transverse sectional view, on line 4—4 of FIGURE 3, showing the float and its sliding association with the container.

In its preferred form, as shown in FIGURES 1, 2 and 3, the invention comprises a tubular body 10 which may be formed of plastic, or other suitable material, and having an elongated opening 11 on one side, the upper end 12 of which is approximately intermediate the upper and lower ends 13 and 14, respectively, of the body 10. A disc-like plug 15 is pressed into the upper end of the body 10 and has a central bore 16 therethrough in which is arranged a plastic sleeve 17 through which a fishing line 18 is slidably threaded, as best shown in FIGURE 3.

The disc-like plug 15 is formed with an annular shoulder 19 to define a flange 20 which projects beyond the wall of the body 10 and functions as a stop for a sleeve 21 which slidably embraces the body 10 and on which is fixed a spherical float 22 of cork, or other buoyant material.

The lower end 14 of the body 10 is closed by a plug 23 whose upper portion 24 is adapted to fit snugly into the lower end 14 of the body 10 and has its upper surface 25 inclined downwardly toward the lower end 26 of the elongated opening 11 in the body 10. The lower end 14 of the body 10 is seated on an annular shoulder 27 formed on the plug 23 whose main body portion 28 is generally conical. A weight 29 is attached to the member 28 by a screw 30 which extends concentrically through a bore 31 in the plug 23, the head 32 of which is preferably countersunk in the inclined top surface 25 thereof, as shown in FIGURE 3.

It will become apparent, by reference to FIGURES 1, 2 and 3, that when the body 10 is suspended on the line 18 the sleeve 21, on which the float 22 is arranged, will drop to its lowermost position, as shown in FIGURES 1 and 3, and close the opening 11 in the body 10. The line 18 has a small weight 33 thereon near its end which is attached to a hook 34 by a swivel 35, and when the assembly is suspended on the line 18 it is supported on the weight 33, as best seen in FIGURE 3. In this position the bait 36, shown in broken lines in FIGURE 3, is enclosed within the body 10 and by the sleeve 21.

When the assembly is cast into the water the buoyant float 22 will support the body 10 which drops through the sleeve 21 exposing the opening 11 therein permitting the baited hook 34 on the line 18 to fall out of the body 10, the inclined surface 25 of the plug 23 aiding in the discharge of the bait. The line 18, being free to slide through the sleeve 17, may extend below the water's surface to any desired depth. The bait 36 is recovered by pulling on the line 18 by which it is drawn into the body 10 through the opening 11 therein and the sleeve 21 will drop by its own weight to close the opening 11, as shown in FIGURES 1 and 3.

Figures 5, 6:
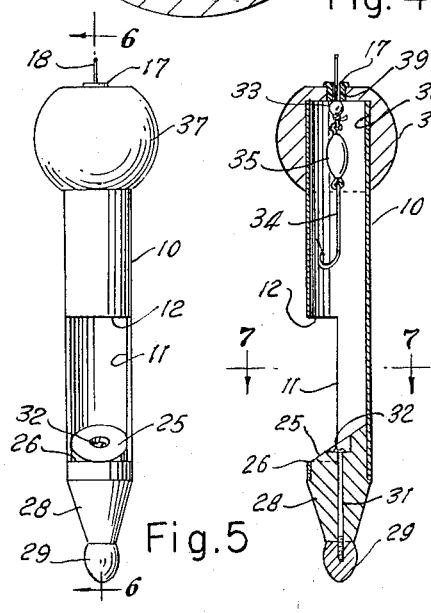
FIGURE 5 is an elevational illustration of a modified form of the invention in which the float is fixed to the upper end of the container, the latter being open.
FIGURE 6 is a vertical section, on line 6—6 of FIGURE 5, showing the device suspended on a line having a hook attached.
Figure 7:
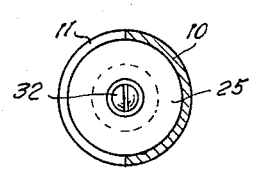
FIGURE 7 is a transverse view, on line 7—7 of FIGURE 6, showing the weighted inclined bottom of the open container.

In the modifications shown in FIGURES 5 and 6 a substantially spherical float 37 is securely attached to the upper end 13 of the body 10, having a concavity 38 receiving the same, and the line 18 is arranged through the sleeve 17 which is seated in a port 39 in the top of the float 37. The structure is essentially the same as that shown in FIGURES 1, 2 and 3 except that the sleeve 21 is not employed. The operation, insofar as the recovery of the bait 36 is concerned, is essentially the same as that of the structures shown in FIGURES 1, 2 and 3 but the opening 11 is not closed.

Figure 8:
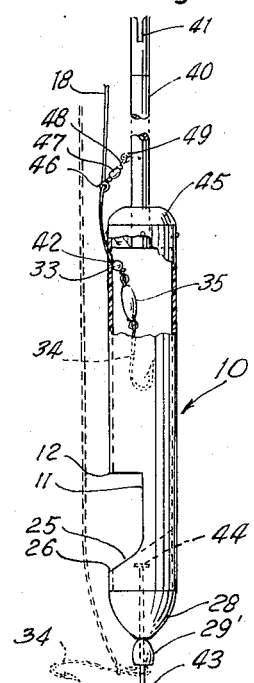
FIGURE 8 is an elevational view, partially in section, showing another modification of the container attached to a shaft for propulsion by a bow, the line being extended through an aperture on one side of the container.

In FIGURE 8 is shown a structure which is adapted for attachment to the end of a shaft 40 having a slot 41 in its outer end by which it is capable of being projected by an archer's bow (not shown). The line 18, which has the small weight 33, the hook 34 and the swivel 35 attached to its end, is arranged through an aperture 42 in one side and at the upper end 13 of the body 10, the hook 34, with its appurtenances, being capable of dropping out through the opening 11 and over the inclined surface 25 of the bottom plug 28. Alternatively, the line 18 can be caused to extend the length of the body 10, exteriorly thereof, and arranged about a shaft 43 having a head 44 which is embedded in the plug 28. This structure is provided with a buoyant plug 45 in the upper end of the body 10 and through this member, aided by the shaft 40 which is also buoyant, the assembly will float. The line 18 is arranged through an eye 46 of a swivel 47 whose opposite eye 48 is attached by an eye screw 49 to the shaft 40 near the plug 45. The lower end of the shaft 43 has a knob 50 formed thereon and a weight 29' is slidably arranged on the shaft 43 by which the hook 34 is removed when the body 10 strikes the water.

While the invention has been described in specific detail it is apparent that certain changes in structure and design may be resorted to by persons skilled in the art without departing from the spirit and intent thereof or the scope of the appended claims.

What is claimed is:

1. In a fish bait saver, a tubular body having means at the top thereof for passage of a fishing line thereinto, a weight on the lower end of said body and having an inclined upper surface, a chamber formed in said body between said means and said weight and having an opening in one side, the lower end of said opening being aligned with the lowermost side of the inclined surface of said weight, the said chamber being capable of receiving live bait secured to said fishing line, a sleeve slidably arranged on said body normally closing said chamber, and a float fixed on said sleeve to lift said sleeve to open said chamber to release its contents when said body is cast into the water.

2. In a device for saving live bait while fishing, the combination comprising a tubular body having a top closure on one end and a weight on its opposite end having an inclined upper face, a chamber formed in said body between said closure and said weight, the said chamber having an opening on one side having its lowermost end adjacent to the lower side of the inclined face of said weight, a sleeve slidable longitudinally on said body and normally closing said opening, and a float fixed on said sleeve to operate said sleeve to uncover said opening when said body is cast into the water.

References Cited by the Examiner
UNITED STATES PATENTS 2,292,743  8/1942  Cordry _____ 43—41.2
3,178,847  4/1965  Mousseau _____ 43—41.2

SAMUEL KOREN, *Primary Examiner.*

D. J. LEACH, *Assistant Examiner.*